W. H. WELCH.
ELECTRICAL CUT-OUT OPERATED BY FLUID PRESSURE.
APPLICATION FILED MAR. 1, 1920.

1,428,463.

Patented Sept. 5, 1922.

Inventor.
Walter H. Welch.
by Wilkinson & Giusta.
Attorneys.

Patented Sept. 5, 1922.

1,428,463

UNITED STATES PATENT OFFICE.

WALTER HENRY WELCH, OF BRISTOL, ENGLAND, ASSIGNOR TO HARVEY FROST & COMPANY, LIMITED, OF LONDON, ENGLAND.

ELECTRICAL CUT-OUT OPERATED BY FLUID PRESSURE.

Application filed March 1, 1920. Serial No. 362,176.

*To all whom it may concern:*

Be it known that I, WALTER HENRY WELCH, a subject of the King of England, residing at Bristol, in England, have invented certain new and useful Improvements in Electrical Cut-Outs Operated by Fluid Pressure, of which the following is a specification.

This invention relates to pressure-operated electrical cut-outs, and has for its main object to provide such a cut-out which may be simple to construct and adjustable for varying fluid pressures. The invention is particularly applicable to portable vulcanizers in which steam as the heating medium is generated by electrical means, and it is desired that the temperature shall be regulated automatically by repetitive cutting off of the current whenever a predetermined pressure is reached in the generator.

According to this invention, a fluid pressure operated electrical cut-out having a bow spring to control the pressure-member by thrust from the central part of the bow spring, is characterized by the bow spring being thrust towards the pressure-operated member by screws one at each end, which screws are separately adjustable for the purpose hereinafter described.

One of the screws may be provided with an index-arm which co-operates with a scale, for example works in or beneath a slot in a wall of the casing wherein the apparatus may be enclosed, such slot having a scale at the side.

The invention consists in the construction arrangement and combination of parts described hereinafter and pointed out in the claim.

In the accompanying drawings, which illustrate one method of carrying out this invention as applied to a portable vulcanizer:—

The same letters indicate the same parts throughout the drawings.

Figure 1:
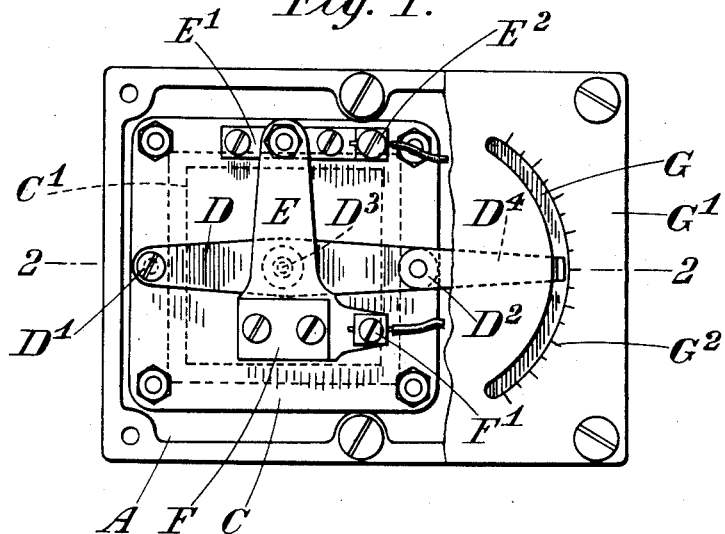
Figure 1 is a plan of the cut-out, part being shown broken away.
Figure 2:
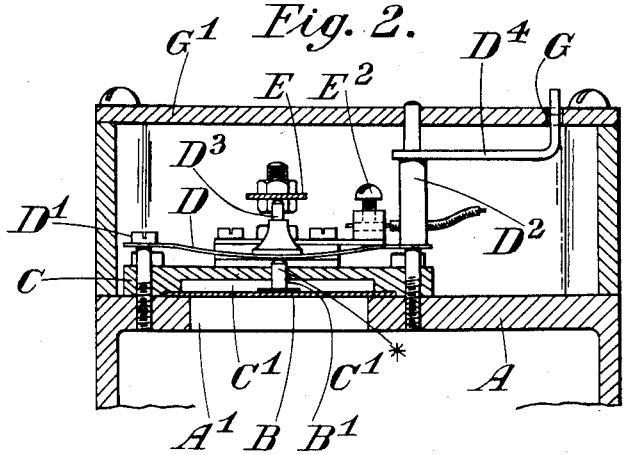
Figure 2 is a vertical section through the same taken on the line 2—2 in Figure 1.

Referring to Figures 1 and 2, a plate A represents one wall of a pressure-chamber which, in a vulcanizer is the steam-generating chamber. In this wall is an opening $A^1$ which is covered by a diaphragm B. This diaphragm may be merely flexible or it may be of resilient material, and is clamped in place by a cover-plate C. The cover-plate is hollowed at $C^1$ on the side which is towards the diaphragm to allow free movement of the latter, but is preferably not so deeply hollowed as to prevent the diaphragm from bearing against it when thrust in to the limit of its movement; the plate C thus serves as a support for the diaphragm. Above the cover-plate is a bow spring D, the centre of which bears upon a thrust-piece $B^1$ which extends through a hole $C^{1*}$ in the cover-plate C and presses against the diaphragm B. The bow spring is held in place by screws $D^1$ and $D^2$, one at each end, which extend through the spring and are carried by the plate A. These screws are adjustable in the plate so that by screwing them further in, the tension of the spring on the diaphragm may be increased, or by drawing them out, it may be decreased, and it will be observed that the screws can be separately adjusted.

A contact-arm E of resilient metal extends transversely across the bow spring D, being carried by a block F on the cover-plate, and a thrust-piece $D^3$ on the top face of the bow-spring bears against the underside of this contact-arm at a point near its root. This arm has a connection $F^1$ for one wire of the electrical circuit and its free end makes contact with another contact-piece indicated at $E^1$, which is also carried by the cover-plate C but is insulated therefrom and provides another connecting point $E^2$ for the electrical circuit of the heating-element.

The screw $D^2$ has a laterally-projecting arm $D^4$ whose end projects through a slot G in one wall $G^1$ of the casing within which the whole apparatus may be enclosed. On this wall along by the side of the slot is a scale $G^2$ marked in lbs. per square inch.

The operation of this apparatus is as follows:—

As the pressure in the generating-chamber rises the thrust against the diaphragm B increases until the spring D is thrust back sufficiently to cause the thrust-piece $D^3$ carried thereby to lift the contact-arm E and thus separate its free end from the contact-piece E¹.

The circuit through the heating-element of the vulcanizer, or whatever other circuit the cut-out may be used for, is thus broken and the generation of steam ceases. As the apparatus cools down, the contact-arm will again automatically come into operation and so the apparatus may be kept automatically at any desired temperature for as long a period as is required.

The screw $D^1$ is used for applying pressure to the diaphragm when assembling the apparatus, so that each cut-out may be sent out to operate at a given pressure with the screw $D^2$ left in such position that the arm $D^4$ is in the middle of the slot G. The user can then move the arm in one direction or the other to decrease or increase the pressure as he may desire, and the scale will indicate how much he increases or decreases the original setting of the apparatus.

It will be seen that this cut-out is simple to make and easily adjustable, and moreover by employing a bow spring instead of the spiral spring usually used in such cut-outs, a flat form of apparatus is obtained which enables the cut-out to be stowed in a small compass, and much greater accuracy of adjustment is found to be obtainable by use of the bow spring instead of a spiral spring.

Figure 3:
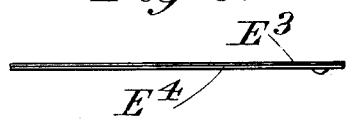
Figure 3 is a side elevation of a modified form of a detail.

If desired, the contact-arm E may be made of two metals, for example steel and brass, as shown at $E^3$, $E^4$, Figure 3, secured face-to-face, the brass strip being placed towards the bow spring so that should the apparatus for any reason become overheated, the heat will be conducted by the metal parts to the said arm and cause it to bend outwards owing to the greater expansion of the brass strip $E^4$ relatively to the steel strip $E^3$. This bi-metallic contact-arm thus constitutes an additional safety-device.

What I claim as my invention and desire to secure by Letters Patent is:—

In a fluid pressure-operated electrical cut-out, the combination with a pressure member subjected to fluid pressure, and an electrical contact device comprising a movable contact member for controlling an electric circuit, of a bow spring having its central part operatively connected with said contact member, a screw positioning one end of the bow spring and arranged to thrust the central part thereof against said pressure member, a plate provided with a slot, a second screw positioning the other end of the bow spring and arranged to thrust the central part thereof against said pressure member, and an index arm that is rigidly attached to the said second screw, and extends into said slot, substantially as described.

In testimony whereof I affix my signature.

WALTER HENRY WELCH.